(12) United States Patent
Plocher et al.

(10) Patent No.: US 7,603,217 B2
(45) Date of Patent: Oct. 13, 2009

(54) SENSOR SYSTEM AND METHOD FOR DETERMINING AT LEAST ONE OF THE WEIGHT AND THE POSITION OF A SEAT OCCUPANT

(75) Inventors: Thomas Plocher, Sulz (DE); Goran Livaja, Balingen (DE)

(73) Assignee: BAG Bizerba Automotive GmbH, Balingen (DE)

( * ) Notice: Subject to any disclaimer, the term of this patent is extended or adjusted under 35 U.S.C. 154(b) by 0 days.

(21) Appl. No.: 11/959,528

(22) Filed: Dec. 19, 2007

(65) Prior Publication Data
US 2008/0178689 A1 Jul. 31, 2008

(30) Foreign Application Priority Data
Jan. 26, 2007 (EP) ................. 07101282

(51) Int. Cl.
*B60R 22/00* (2006.01)
*B60R 21/16* (2006.01)
(52) U.S. Cl. ........................... 701/45; 280/735
(58) Field of Classification Search ........... 280/735; 701/45
See application file for complete search history.

(56) References Cited

U.S. PATENT DOCUMENTS

| | | | | | |
|---|---|---|---|---|---|
| 5,724,024 | A | * | 3/1998 | Sonderegger et al. | 340/562 |
| 6,005,485 | A | * | 12/1999 | Kursawe et al. | 701/45 |
| 6,070,115 | A | * | 5/2000 | Oestreicher et al. | 701/45 |
| 6,243,634 | B1 | * | 6/2001 | Oestreicher et al. | 701/45 |
| 6,578,870 | B2 | * | 6/2003 | Winkler et al. | 280/735 |
| 6,675,080 | B2 | * | 1/2004 | Winkler | 701/45 |
| 6,685,222 | B2 | * | 2/2004 | Winkler et al. | 280/735 |
| 6,735,508 | B2 | * | 5/2004 | Winkler | 701/45 |
| 6,801,111 | B2 | | 10/2004 | Siebels et al. | |
| 6,823,959 | B2 | * | 11/2004 | Winkler et al. | 701/45 |
| 6,845,339 | B2 | * | 1/2005 | Winkler et al. | 701/45 |
| 6,876,912 | B2 | * | 4/2005 | Winkler | 701/45 |
| 7,024,295 | B2 | * | 4/2006 | Oestreicher et al. | 701/45 |
| 7,043,997 | B2 | * | 5/2006 | Mattson et al. | 280/735 |
| 7,383,113 | B2 | * | 6/2008 | Marchthaler | 701/45 |
| 7,460,938 | B2 | * | 12/2008 | Winkler | 701/45 |
| 7,464,960 | B2 | * | 12/2008 | Winkler et al. | 280/735 |
| 2001/0025730 | A1 | * | 10/2001 | Cook et al. | 701/45 |
| 2002/0011722 | A1 | * | 1/2002 | Winkler et al. | 280/735 |
| 2003/0040858 | A1 | | 2/2003 | Wallace | |

(Continued)

FOREIGN PATENT DOCUMENTS

DE 38 09 074 10/1989

(Continued)

*Primary Examiner*—Harshad Patel
*Assistant Examiner*—Jonathan Dunlap
(74) *Attorney, Agent, or Firm*—Leydig, Voit & Mayer, Ltd.

(57) ABSTRACT

A sensor system for determining at least one of the weight and the position of a seat occupant is provided, the sensor system comprising a control unit, at least two spaced measurement weight sensors, wherein each measurement weight sensor provides measurement weight sensor signals, and at least one virtual weight sensor provides virtual weight sensor signals, wherein the virtual weight sensor signals are calculated using the measurement weight sensor signals of at least one of the measurement weight sensors, and at least one of the weight and the position of the seat occupant is calculated using measurement weight sensor signals and the virtual weight sensor signals.

45 Claims, 6 Drawing Sheets

U.S. PATENT DOCUMENTS

| | | | |
|---|---|---|---|
| 2003/0085556 A1* | 5/2003 | Winkler et al. | 280/735 |
| 2003/0085557 A1* | 5/2003 | Winkler et al. | 280/735 |
| 2003/0105571 A1* | 6/2003 | Winkler | 701/45 |
| 2003/0163234 A1* | 8/2003 | Olsen et al. | 701/45 |
| 2004/0073347 A1* | 4/2004 | Winkler | 701/45 |
| 2004/0232674 A1* | 11/2004 | Winkler et al. | 280/735 |
| 2005/0006151 A1* | 1/2005 | Mattson et al. | 701/45 |
| 2005/0090959 A1* | 4/2005 | Winkler | 701/45 |
| 2006/0124377 A1* | 6/2006 | Lichtinger et al. | 701/45 |
| 2007/0112283 A1* | 5/2007 | Ando et al. | 600/587 |
| 2007/0266706 A1* | 11/2007 | Gehrke et al. | 60/605.1 |
| 2008/0022784 A1* | 1/2008 | Wehinger et al. | 73/862.621 |
| 2008/0078254 A1* | 4/2008 | Sautter et al. | 73/862.69 |
| 2008/0140288 A1* | 6/2008 | Winkler | 701/45 |
| 2008/0281493 A1* | 11/2008 | Winkler et al. | 701/45 |

FOREIGN PATENT DOCUMENTS

| | | |
|---|---|---|
| EP | 1 028 867 | 8/2000 |
| EP | 1 299 269 | 4/2003 |
| EP | 1 742 029 | 1/2007 |
| WO | WO 2006/092325 | 9/2006 |
| WO | WO 2006/105902 | 10/2006 |
| WO | WO 2007/006364 | 1/2007 |

* cited by examiner

SENSOR SYSTEM AND METHOD FOR DETERMINING AT LEAST ONE OF THE WEIGHT AND THE POSITION OF A SEAT OCCUPANT

The present application claims the priority of European application number EP 07 101 282.7 of Jan. 26, 2007, which is incorporated herein by reference in its entirety and for all purposes.

BACKGROUND OF THE INVENTION

The present invention is related to a sensor system for determining at least one of the weight and the position of a seat occupant.

The invention is further related to a method for determining at least one of the weight and the position of a seat occupant.

Vehicles comprise airbags for avoiding serious injuries due to collisions. It is advantageous if the deployment force of an airbag is controlled. The measurement of the weight of a seat occupant in the vehicle is a method to provide controlled data for controlling the deployment force. An airbag should not be deployed or should be deployed with a lower deployment force if, compared to an average adult, a light person or small child sits on a vehicle seat. The weight information and/or position information related to the seat occupant can be used to classify a seat occupant and thereby control the deployment force of the airbag.

EP 1 299 269 B1 discloses a method for classifying vehicle seat occupants using a plurality of weight sensors within a vehicle seat.

EP 1 028 867 B1 discloses a method of determining factors relating to a seat occupant in a vehicle for controlling the reaction of a safety restrain system, using a plurality of spaced weight sensors associated with the vehicle seat.

The center of gravity is used to determine a correction factor representing the ratio of the total weight of an occupant to the weight applied to the seat, when an occupant is seated so as to have the calculated center of gravity. The actual weight of the seat occupant is calculated by multiplying the total applied weight to the vehicle seat by the correction factor.

DE 38 09 074 C2 discloses a security system for a vehicle comprising four sensors for determining the seating position of a seat occupant.

Further weight classification systems are disclosed in U.S. Pat. Nos. 6,070,115 A, 6,801,111 B1, 6,243,634 B1 or 7,024,295 B2.

SUMMARY OF THE INVENTION

In accordance with the present invention, a sensor system is provided, which has a simple construction, and a method for determining at least one of the weight and the position of a seat occupant is provided, which allows a simple sensor system construction.

In accordance with the present invention, a sensor system for determining at least one of the weight and the position of a seat occupant comprises a control unit, at least two spaced measurement weight sensors, wherein each measurement weight sensor provides measurement weight sensor signals, and at least one virtual weight sensor providing virtual weight sensor signals, wherein the virtual weight sensor signals are calculated using the measurement weight sensor signals of at least one of the measurement weight sensors, and wherein at least one of the weight and the position of the seat occupant is calculated using measurement weight sensor signals and the virtual weight sensor signals.

In accordance with the present invention, at least two measurement weight sensors are provided as hardware and at least one weight sensor (the at least one virtual weight sensor) is a non-hardware sensor that is simulated by measurement weight sensors. This allows to reduce the number of "hardware" measurement weight sensors in the system without compromising the determination of the weight and/or the position of a seat occupant.

Such, a sensor system can be provided which is easy to mount and which is, because of the possibility of a reduced number of measurement weight sensors, very cost effective. Also, this sensor system is more reliable because of the lower number of measurement weight sensors.

For example, it is also possible to check a measurement weight sensor with regard to malfunction if a virtual weight sensor is associated with the corresponding measurement weight sensor. The virtual weight sensor can simulate the measurement weight sensor and the actual measurement weight sensor signals can be compared with the virtual weight sensor signals. Too high a deviation in the compared signals is a hint for a malfunction.

In a particular embodiment, the sensor system provides weight data for the seat occupant without providing position information.

In particular, the at least one virtual weight sensor is embodied in the control unit. The at least one virtual weight sensor can be realized "non-physical" by a software solution. Such, a corresponding hardware measurement weight sensor does not have to be provided or an associated measurement weight sensor in hardware can be checked on malfunction.

In particular, the calculations for the virtual weight sensor signals and/or for determining weight data/position data are done by the control unit. The control unit can be a unit separate from the measurement weight sensors or can be an integral part of one or more measurement weight sensors. The control unit can be a unit block or can consist of several parts distributed over the sensor system.

In one particular embodiment, the at least one virtual weight sensor is used as a substitute for a measurement weight sensor. The virtual weight sensor (which is not realized in hardware) substitutes the hardware measurement weight sensor. Such, the sensor system comprises a reduced number of hardware measurement weight sensors without compromising in providing weight data and/or position data for the seat occupant.

In an embodiment, a seat mounting device takes the place of a substituted measurement weight sensor. A seat can be fixed to a seat fixing base (like the seat fixing base of a vehicle) via measurement weight sensors. If a corresponding hardware measurement weight sensor is not provided, the fixing has to be done by other means, and in particular by a seat mounting device. Such a seat mounting device can be a bolt or a screw or a soldering joint or the like.

It is also possible that the at least one virtual weight sensor is used in addition to an associated measurement weight sensor. The at least one virtual weight sensor is allocated to the corresponding hardware measurement weight sensor. It is then possible to compare the virtual weight sensor signals with the measurement weight sensor signals and check whether there is a crucial deviation between these signals.

It is possible that the control unit is an external device in relation to the measurement weight sensors. The measurement weight sensors are connected to the control unit by, for example, a bus system.

In an alternative embodiment, the control unit is at least partially integrated in one or more measurement weight sensors. For example, the control unit or parts of the control unit are arranged in a sensor housing of one or more measurement weight sensors or the control unit or respective parts are attached to the corresponding sensor housing or sensor housings.

In one particular embodiment, the control unit is distributed over several measurement weight sensors. Such, the measurement weight sensors with their corresponding portion of the control unit can perform calculations for the signal evaluation and can also provide weight data and/or position data related to a seat occupant which can be processed, for example, by an airbag control unit. For example, the measurement weight sensors with their corresponding control unit portions are coupled to a signal distribution system like a bus system. The measurement weight sensors provide the measurement weight signals and also perform signal evaluation and data evaluation tasks within the sensor system. In particular, different measurement weight sensors can perform different tasks. Such, different tasks can be allocated to different measurement weight sensors. Via the distribution of the control unit over several measurement weight sensors, the signal evaluation/data evaluation tasks can be distributed over several measurement weight sensors.

It is advantageous when the measurement weight sensors are positioned on the corners of a polygon, and the at least one virtual weight sensor is allocated to a corner of the polygon. The measurement weight sensors do not have to be positioned at the same height in relation to each other. Depending on a specific seat, it might be advantageous if, for example, a front measurement weight sensor is closer to the seat surface of a seat bottom than a back measurement weight sensor. The at least one virtual weight sensor can be allocated to a corner of the polygon which is not provided with a measurement weight sensor. Such, the weight distribution on the polygon can be evaluated using the virtual weight sensor signals.

It is advantageous when a certain position in relation to the seat is allocated to the at least one virtual weight sensor. Since the at least one virtual weight sensor simulates a hardware measurement weight sensor, and a hardware measurement weight sensor is arranged at a certain position, the virtual weight sensor produces virtual weight sensor signals which are in principle depending on the position.

It is expedient if a calculation mode for the virtual weight sensor signals depends on which position is allocated to the at least one virtual weight sensor. Such, the relative position of the substitute virtual weight sensor compared to the other at least two measurement weight sensors can be taken into account.

In one embodiment, the at least one virtual weight sensor is allocated to a position experiencing the smallest weight forces. Such a position depends on the specific seat construction. However, with the present sensor system it is not compulsory to use the position experiencing the smallest weight forces. Any other position is possible.

When a calculation mode for the virtual weight sensor signals depends on which measurement weight sensor or sensors are used for calculating the virtual weight sensor signals, excellent results for the weight data and/or position data can be achieved.

It is advantageous when the control unit comprises a database with predetermined data stored, said predetermined data specifying calculation modes for calculating the virtual weight sensor signals. Using this data, the control unit can calculate the virtual weight sensor signals out of the measurement weight sensor signals of at least one measurement weight sensor. The predetermined data have been measured or calculated before and usually are seat-specific.

The predetermined data can be, for example, available in the form of defined functions (in particular interpolation functions) and/or in the form of predefined tabular values. It is also possible that the predetermined data are data of an algorithm stored in the database.

The control unit comprises a virtual weight sensor unit which calculates virtual weight sensor data. The virtual weight sensor unit receives measurement weight sensor signals of at least one measurement weight sensor and further data for calculating the virtual weight sensor data.

It is further advantageous if the control unit comprises a data processing unit calculating the spatial center of the measurement weight sensor signals for measurement weight sensors. With knowledge of the spatial center of the measurement weight sensor signals it is possible to determine a calculation mode for calculating the virtual weight sensor signals.

It is further advantageous, if the control unit comprises a data processing unit which calculates at least one of seat occupant weight data and seat occupant position data using virtual weight sensor signals and measurement weight sensor signals. Such, the weight and/or the position of a seat occupant can be calculated and provided for further processing. In one embodiment, only weight data without additional position data are provided.

In an advantageous embodiment, the data processing unit calculates the sum of the measurement weight sensor signals and the virtual weight sensor signals (taken for the same point of time). Such, weight information for a seat occupant can be calculated in a simple manner.

In one embodiment, the control unit comprises a classification unit providing seat occupancy classification data classifying at least one of weight and position of the seat occupant. Such, a limited number of data can be provided for further processing to simplify further processing.

In particular, a seat occupancy classification data set is provided comprising a finite number of set elements. For example, the number of set elements is limited to a number smaller than ten.

In particular, the seat occupancy classification data are provided to an airbag control unit for controlling the deployment force of the airbag.

Provision can be made that a spatial data field is allocated to the seat and the sensor system, said spatial data field comprising sub-fields, and wherein calculation modes for virtual weight sensor signals depend on the sub-field in which a spatial center of measurement weight sensor signals fall. Such, a method is provided.

It is advantageous if care is taken of that the calculation modes are determined such that the underlying data are, when crossing the border of adjacent sub-fields continuous. Such, the internal consistency of the calculation modes is guaranteed.

In one embodiment, a measurement weight sensor comprises a first part for fixing to a seat mounting element, and a second part for fixing to the seat. With the relative movement or position of the first part and second part, a sensor signal can be generated characterizing the weight force that is effective. Via the measurement weight sensor, a seat mounting element (which is, for example, fixed to a vehicle) and a seat element (which is fixed to the seat) can be fixed relative to each other allowing a relative movement for measuring weight forces.

The sensor system in accordance with the present invention is, in particular, used with a seat like a vehicle seat. The sensor system is fixed to the seat.

In particular, the sensor system is allocated to a seat bottom for determining the weight and/or the position of a person sitting on the seat bottom.

Furthermore, in accordance with the method of the present invention, measurement weight sensor signals are provided from at least two spaced apart measurement weight sensors, virtual weight sensor signals are calculated using the measurement weight sensor signals of at least one measurement weight sensor, the virtual weight sensor data simulating a measurement weight sensor, and at least one of the weight and the position of the seat occupant is calculated using measurement weight sensor signals and the virtual weight sensor signals.

The method in accordance with the present invention has the advantages already outlined together with the sensor system in accordance with the present invention.

With the virtual weight sensor data a non-existent measurement weight sensor can be simulated. Such, the number of required measurement weight sensors can be reduced.

For further embodiments of the method in accordance with the present invention the advantages have been outlined in connection with the sensor system in accordance with the present invention.

DETAILED DESCRIPTION OF THE INVENTION

Figure 1:
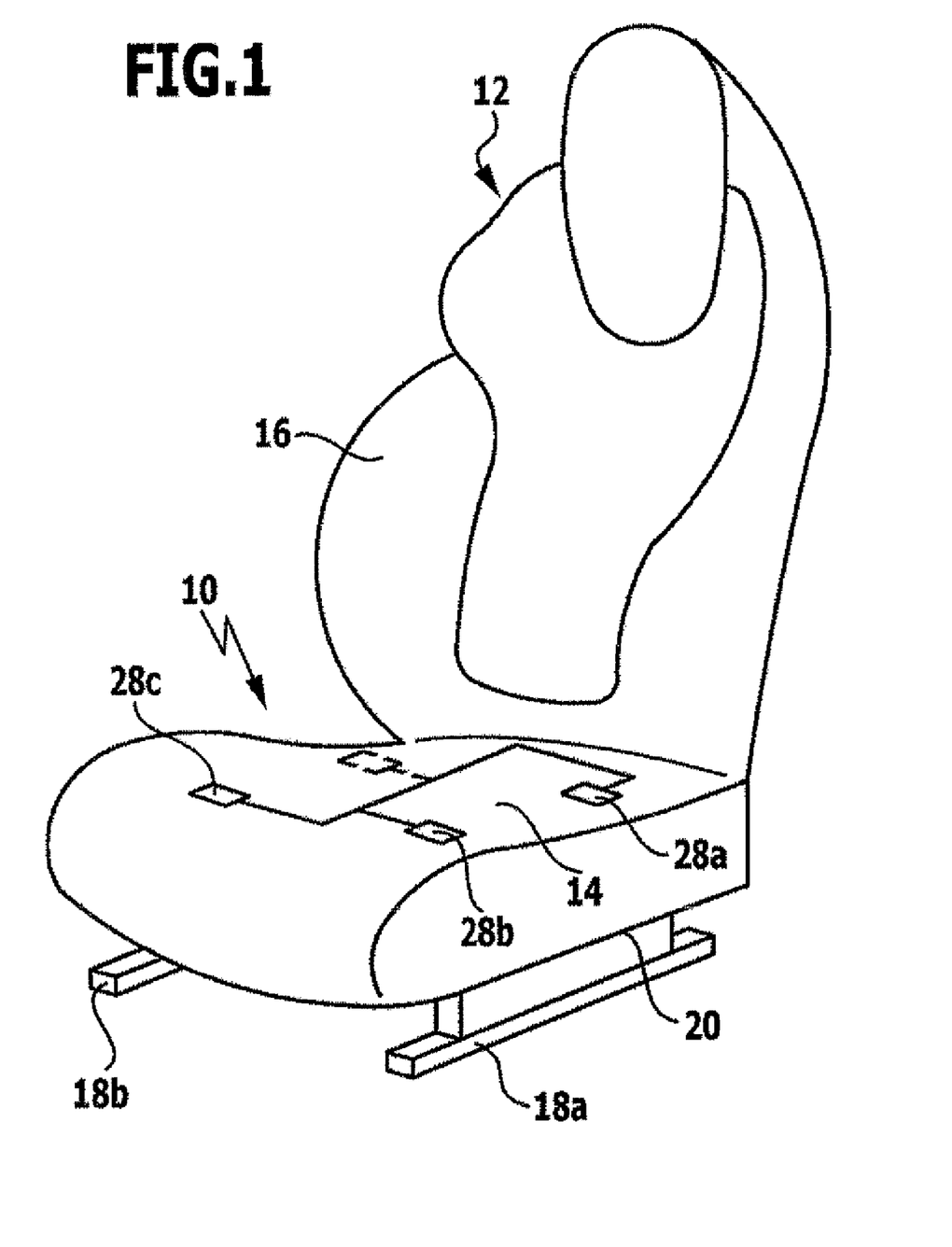
FIG. 1 shows schematically a seat provided with an embodiment of a sensor system in accordance with the present invention.
Figure 3:
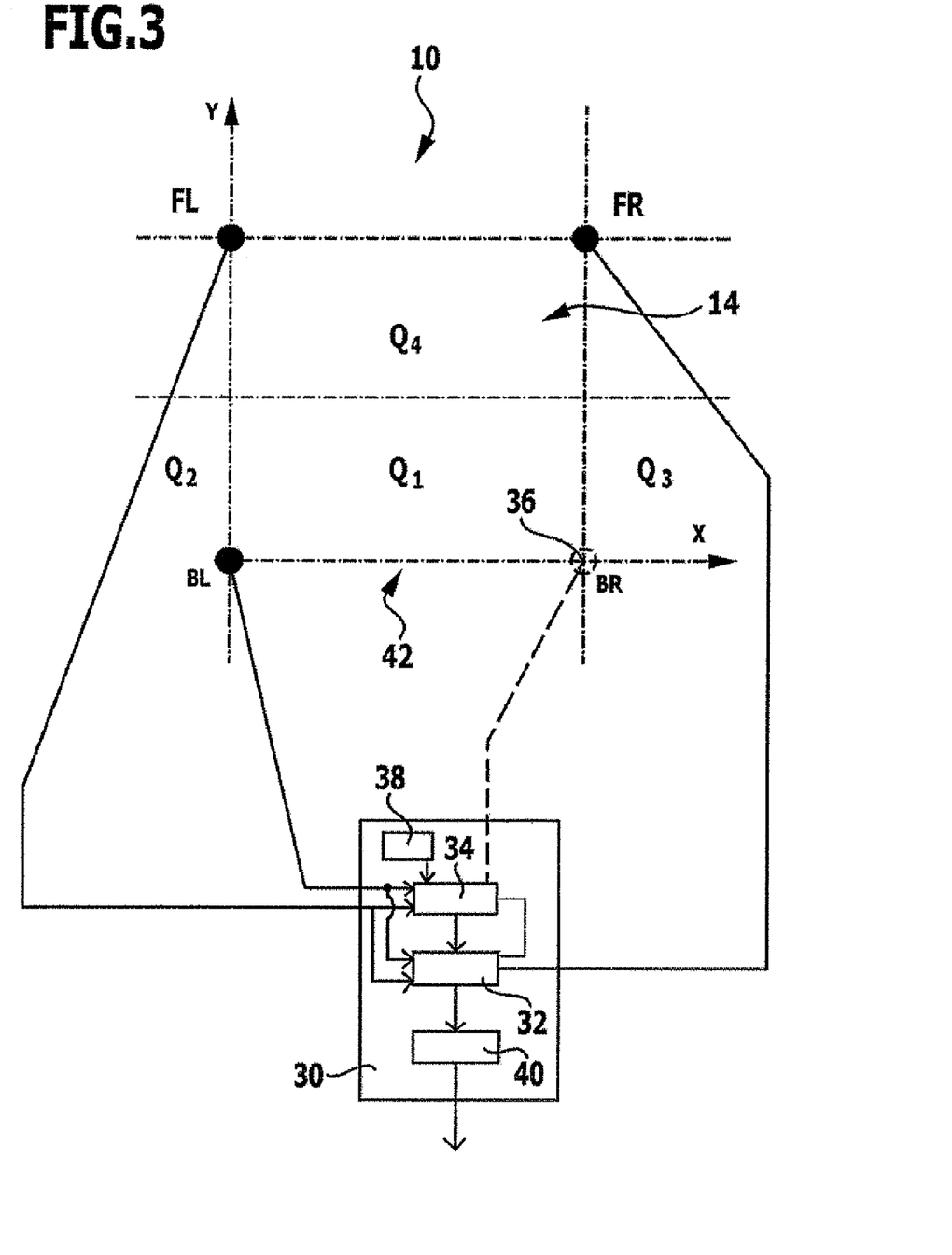
FIG. 3 is a schematic view of a sensor system in accordance with the present invention.

An embodiment of a sensor system in accordance with the present invention, which is generally shown in FIG. 1 and FIG. 3 and designated with 10, is for use within a seat 12. The seat 12 is, in particular, a vehicle seat mounted to a vehicle. The vehicle comprises a restrain system including an airbag allocated to the seat 12.

The seat 12 has a seat bottom 14, on which the seat occupant sits, and a seat back 16. The sensor system 10 is allocated to the seat bottom 14.

The vehicle comprises seat mounting elements 18a, 18b for fixing the seat 12 with regard to the vehicle. The seat mounting elements 18a, 18b are, for example, mounting rails. The seat 12 comprises corresponding seat elements 20 via which the seat 12 can be fixed on the seat mounting elements 18a, 18b. In one embodiment, the fixation of the seat 12 to the seat mounting elements 18a, 18b is done via measurement weight sensors 22 (FIG. 2) of the sensor system 10.

Figure 2:
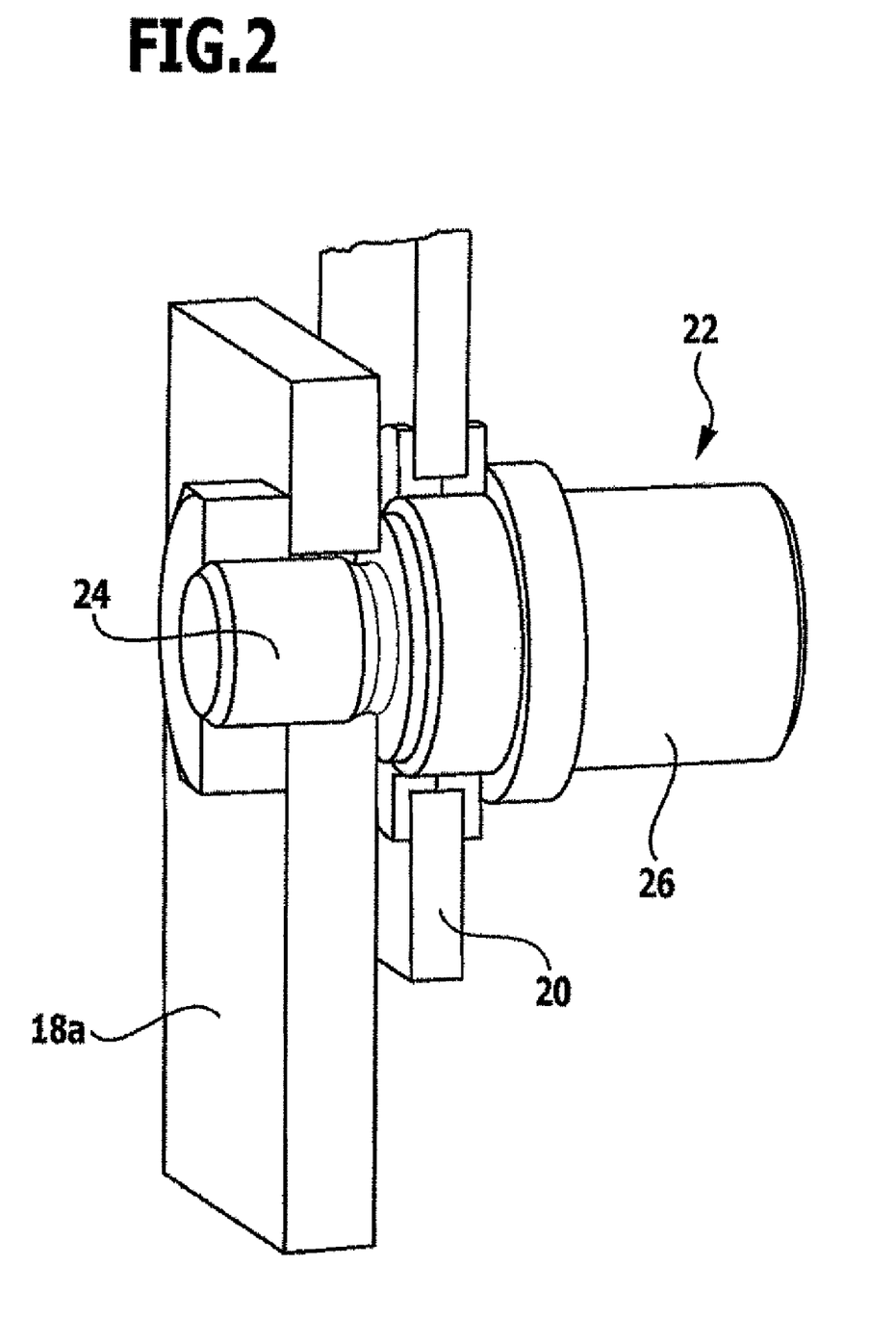
FIG. 2 is a schematic view of an embodiment of a measurement weight sensor fixed to a seat mounting element and a seat element.

The measurement weight sensors 22 provide force signals and, in particular, weight signals. The measurement weight sensor can be constructed in such a way that the forces (in particular weight forces) are measured directly. It is also possible that a measurement weight sensor is constructed in such a way that the forces exerted are measured in an indirect way. For example, pressure sensors are used as measurement weight sensors and using the measured effective pressures, the exerted forces are deduced.

An embodiment of a measurement weight sensor 22 comprises a first part 24 and a second part 26, which are moveable relative to each other. The first part 24 is fixed to a seat mounting elements 18a, 18b. The second part 26 is fixed to a seat element 20. The measurement weight sensor 22 measures the force exerted to it. This force is caused by the weight of the seat 12 and a seat occupant. The measurement weight sensor 22 provides corresponding measurement weight sensor signals.

For example, the measurement weight sensor 22 has a bolt-like structure.

Examples of weight sensors are disclosed in WO 2006/092325, WO 2006/105902, EP 1 742 029, or in the application PCT/EP2006/004792.

In a further embodiment, the measurement weight sensors of the sensor system 10 are integrated in the seat bottom 14. For example, the measurement weight sensors 22 are attached to a mat-like structure which is positioned within the seat bottom 14.

The sensor system 10 comprises several measurement weight sensors 28a, 28b, 28c, for example, of the type 22. In accordance with the present invention, at least two measurement weight sensors are provided. The measurement weight sensors 28a, 28b, 28c are arranged apart from each other such that there is a distance between neighboring measurement weight sensors. They are arranged in such a way that the weight of a occupant of the seat 12 and/or the position of the occupant on the seat 12 can be determined.

As indicated in FIG. 3, an embodiment of a sensor system 10 in accordance with the present invention comprises a measurement weight sensor FL (front left) of the type 22, a measurement weight sensor FR (front right), and a measurement weight sensor BL (back left). The back positions are adjacent to the seat back 16. These sensors are, respectively, arranged on the corners of a polygon (which is, e.g., a rectangle). A projection of the polygon on the seat bottom 14 lies within the seat bottom 14. The x-direction and y-direction in FIG. 3 indicate the extension directions of the seat bottom 14. The direction of gravity is perpendicular to the x-direction and y-direction.

The measurement weight sensors can be arranged at the same height relative to each other in the direction of gravity or different sensors can be arranged at different heights.

Depending on the structure of the seat 12 and/or the weight and/or the position of a seat occupant, the force exerted on the sensors FL, FR and BL might be different.

The sensor system 10 comprises a control unit 30. The control unit 30 might be separate from the measurement weight sensors FL, FR and BL. For example, the control unit 30 is an external device which is positioned outside housings of the measurement weight sensors. In an alternative embodiment, the control unit 30 is integrated in one or several of the measurement weight sensors FL, FR and BL. The control unit 30 or parts of the control unit 30 can be positioned in a sensor housing of the corresponding measurement weight sensor or corresponding measurement weight sensors or can be attached to such a housing. Such, the measurement weight sensor or measurement weight sensors with integrated control unit or integrated portions of the control unit 30 can also perform data evaluation and/or signal evaluation processes.

The measurement weight sensors FL, FR and BL are connected to the control unit 30 via corresponding signal lines. Signal lines can be part of a bus system like a field bus system.

If the control unit 30 is distributed over several measurement weight sensors 22 and integrated in measurement weight sensors, different calculation and/or evaluation tasks can be allocated to different measurement weight sensors with their corresponding control unit portion.

The measurement weight sensors FL, FR and BL are realized in hardware and provide their corresponding measurement weight sensor signals 22 to the control unit 30. The control unit 30 comprises a data processing unit 32. This data processing unit 32 processes the measurement weight sensor signals.

Further, the control unit 30 comprises a virtual weight sensor unit 34. This virtual weight sensor unit 34 "simulates" at least one virtual weight sensor BR. A virtual weight sensor is not realized in hardware but in software. The virtual weight sensor has an output of weight signals. The virtual weight sensor BR is embodied in the control unit 30. Such a virtual weight sensor BR substitutes, for example, a measurement weight sensor 22 on a corner of the polygon outside the corners on which the measurement weight sensors FL, FR and BL are seated.

The virtual weight sensor BR is a substitute for a measurement weight sensor on the position 36. At this position, the seat 12 is fixed to the corresponding seat mounting element 18a or 18b with a corresponding mounting device which is, for example, a bolt or a screw or a soldered connection.

The virtual weight sensor unit 34 provides virtual weight sensor signals which are calculated using the measurement weight sensor signals of at least one measurement weight sensor FL, FR or BL. Such, at least one of the measurement weight sensors FL, FR and BL is connected to the virtual weight sensor unit 34 providing corresponding measurement weight sensor signals.

(In the embodiment of FIG. 3 the measurement weight sensor FL and the measurement weight sensor BL provide their measurement sensor signals to the virtual weight sensor unit 34.)

The virtual weight sensor unit 34 calculates the virtual weight sensor signals using predetermined data stored in a database 38 of the control unit 30. The data stored in the database 38 can be, for example, tabular values or stored functions or stored algorithms. Such functions can be, in particular, interpolation functions as outlined later.

In particular, the database 38 stores data corresponding to different calculation modes for the virtual weight sensor signals. It is advantageous if different calculation modes for different occupancy situations are provided, as outlined below.

The data processing unit 32 (or another data processing unit of the control unit 30) can also be used to calculate a spatial center of the measurement weight sensor signals of the measurement weight sensors FL, FR and BL. When the spatial center of the measurement weight sensor signals is known, the corresponding information can be used to choose a particular calculation mode for calculating the virtual weight sensor signals.

It is to be noted that the spatial center of the measurement weight sensor signals does not specify the center of mass for the seat 12 with a seat occupant but is a kind of intermediate entity for performing the method in accordance with the present invention.

With the calculated virtual weight sensor signals and the measurement weight sensor signals incoming from the measurement weight sensors FL, FR and BL, the data processing unit 32 calculates at least one of weight data and position data for the seat occupant. In particular, the data processing unit 32 sums up the measurement weight sensor signals of the measurement weight sensors FL, FR and BL, and the virtual weight sensor signal of the virtual weight sensor BR. This summed up data (which are taken at the same point of time or time interval) includes seat information.

The control unit 30 further comprises a classification unit 40 which determines from the data provided from the data processing unit 32 classification data classifying the weight and/or the position of the seat occupant.

In a particular embodiment, the classification unit 40 provides weight data to an airbag control unit.

The classification data are, in particular, data comprised by a classification data set. The classification data set includes a finite number of set elements. In a particular embodiment, the classification data set comprises five set elements for classification of the weight of a seat occupant and a further set element indicating a malfunction.

The embodiment as shown in FIG. 3 comprises three measurement weight sensors and one virtual weight sensor. In accordance with the present invention, just two measurement weight sensors can be provided or more than three measurement weight sensors can be provided. Further, more than one virtual weight sensor can be provided.

In a particular embodiment, the position 36 for a virtual weight sensor is chosen such that the corresponding position on the seat bottom 14 is a position which experiences the lowest forces compared to the other positions.

However, it has been demonstrated that the method in accordance with the present invention also works when a position 36 is chosen which is not the position experiencing the lowest forces but, for example, the highest forces or intermediate forces.

The method for determining at least one of the weight and the position of a seat occupant in accordance with the present invention functions as follows:

The measurement weight sensors FL, FR and BL provide their measurement weight sensor signals to the control unit 30 and are processed by the data processing unit 32. The data processing unit 32 calculates a spatial center $\vec{c}$ of the measurement weight sensors 22 as follows:

$$\vec{c} = \sum_{i=1}^{n} \vec{r}_i S(i) \bigg/ \sum_{i=1}^{n} S(i); \quad (1)$$

$\vec{r}_i$ is the vector of the position of the measurement weight sensor i and S(i) is the measurement weight sensor signal of the measurement weight sensor i.

The sum goes over the total number n of measurement weight sensors contributing.

In the example of the embodiment of FIG. 3, the center of the measurement weight sensor signals can be calculated as:

$$\vec{c} = \left( \frac{S(FR)}{S(FL) + S(FR)} \right) \frac{1}{S(FL) + S(FR) + S(BL)}, \quad (2)$$

wherein the position of the measurement weight sensor BL is used as origin. The vector $\vec{c}$ has an x-component and y-component.

A spatial data field 42 is allocated to the sensor system 10 and the seat bottom 14. The data field 42 is subdivided in sub-fields $Q_1$, $Q_2$, $Q_3$, $Q_4$ and so on.

The spatial center of the measurement weight sensor signals lies in one of the sub-fields, wherein the particular sub-field depends on the seat occupancy, and in particular on at least one of the weight of the seat occupant and the position of the seat occupant. The virtual weight sensor unit 34 chooses the calculation mode for the virtual weight sensor signals depending on in which sub-field (for example $Q_1$, $Q_2$, $Q_3$ or $Q_4$) the spatial center of the measurement weight sensor signals falls.

Figure 4:
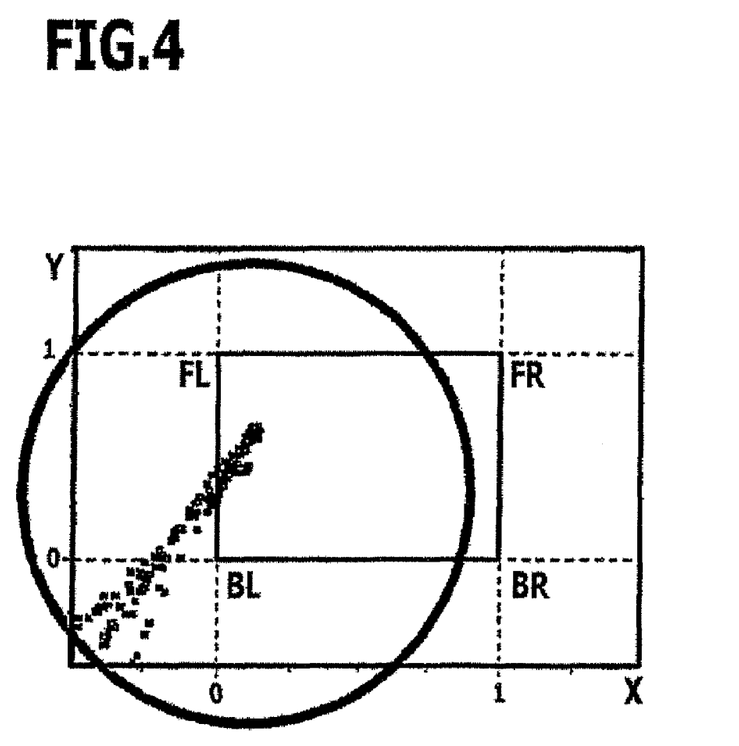
FIG. 4 is a schematic diagram illustrating an intermediate step for calculating virtual weight sensor signals.

FIG. 4 shows a diagram of calculated spatial centers of the measurement weight sensor signals for different seat occupancy conditions for the embodiment of FIG. 3. It is clearly visible that the center of measurement weight sensor signals can be in different positions in relation to the measurement weight sensor signals FL, FR, BL.

The calculation mode f for the virtual weight sensor signals is based on predetermined data. These predetermined data are specific for a particular seat 12. These data (for example, as tabular values or interpolation functions) have been determined before and are stored in the database 38.

The predetermined data are, in particular, predetermined in such a way that, they do not have a step when crossing the border of adjacent sub-fields (for example ($Q_2$-$Q_1$ or $Q_1$-$Q_4$ or $Q_1$-$Q_3$). In particular, the data when crossing such a border are continuous. For example, a continuous function over a border is provided.

In a particular example, the polygon on which corner the measurement weight sensors FL, FR and BL are arranged and on which other corner the virtual weight sensor BR is virtually arranged, is subdivided into two sub-fields $Q_1$ and $Q_4$ of equal proportion. The sub-field $Q_1$ comprises a corner on which the measurement weight sensor BL is arranged and a corner on which the virtual weight sensor BR is virtually arranged. The sub-field $Q_4$ comprises a corner on which the measurement weight sensor FL is arranged and a corner on which the measurement weight sensor FR is arranged.

To the left side of the sub-field $Q_1$ a sub-field $Q_2$ is arranged and to the right side of the sub-field $Q_1$ a sub-field $Q_3$ is arranged.

In this particular embodiment, the virtual weight sensor signals (for the virtual weight sensor BR) are calculated using the measurement weight sensor signals from the measurement weight sensor BL, when the spatial center of measurement weight sensor signals falls in the sub-fields $Q_1$ or $Q_2$ or $Q_3$. The calculation mode for $Q_1$, $Q_2$ and $Q_3$ is, however, different.

Figure 5:
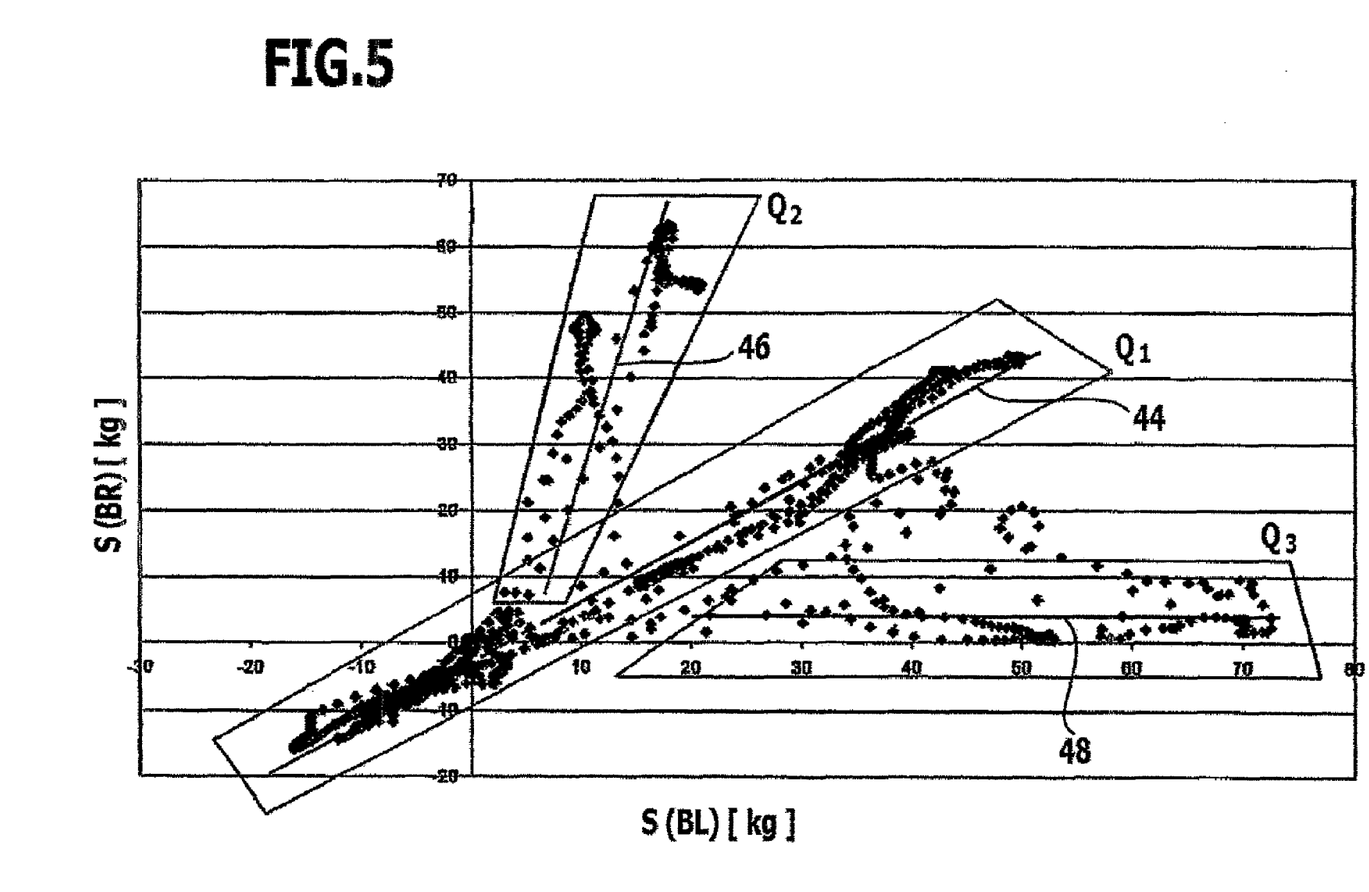
FIG. 5 is a diagram showing different calculation modes for different sub-field when a virtual weight sensor BR according to FIG. 3 is simulated by a measurement weight sensor BL.

FIG. 5 shows measured values (dots), when instead of the virtual weight sensor BR a real measurement weight sensor is used. Such a measurement is done to provide the data for the calculation modes. From FIG. 5 it can be seen, that the sub-fields $Q_1$, $Q_2$ and $Q_3$ have different characteristics.

From these measured data, interpolation functions 44, 46, 48 are determined. These functions depend on the sub-field. They are stored in the database 38. For example, the interpolation functions 44, 46, 48 are multipolynomial interpolation functions.

Figure 6:
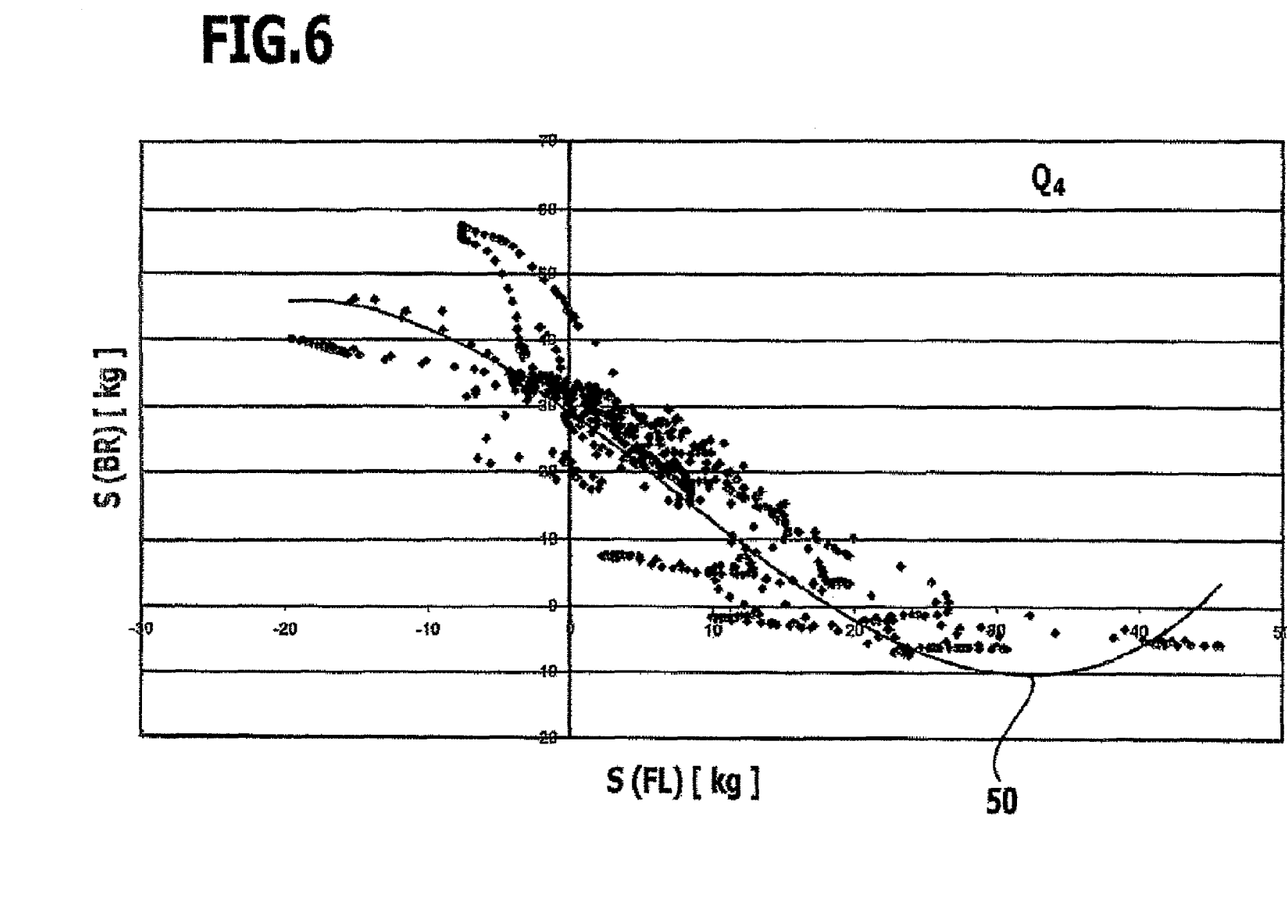
FIG. 6 shows a diagram when in a corresponding sub-field the virtual weight sensor BR according to FIG. 3 is simulated by a sensor FL.

FIG. 6 shows the measured data (dots), when a measurement weight sensor is used instead of the virtual weight sensor BR and a interpolation function 50. The interpolation function 50 as shown in FIG. 6 is a very crude approximation. Better approximations can be used, if necessary.

When determining the weight (or position) of a seat occupant of the seat 12 with sensor system 10, only the functions 44, 46, 48, 50 are used. The virtual weight sensor unit 34 calculates the virtual weight sensor signals $S(BR)=f(\vec{c})$ using the functions 44, 46, 48, 50. Which function is used depends on in which sub-field ($Q_1$, $Q_2$, $Q_3$ or $Q_4$) the spatial center of measurement weight sensor signals falls.

After calculation of the virtual weight sensor data, the virtual weight sensor unit 34 provides the results to the data processing unit 32. The data processing unit 32 combines the measurement weight sensor signals and the virtual weight sensor signals which belong together (taken at the same point of time or in the same time interval). In particular, the data processing unit 32 provides a sum signal $\Sigma=S(BR)+S(FL)+S(FR)+S(BL)$ including the measurement weight sensor signals (for example, of the measurement weight sensors FL, FR and BL) and the virtual weight sensor signal.

This signal characterizes the weight of a seat occupant.

The classification unit 40 transforms this weight signal into classification data that can be fed to an airbag control unit.

In accordance with the present invention, the sensor system 10 comprises at least two apart measurement weight sensors 22. Using the measurement weight sensor signals of at least one of these measurement weight sensors, virtual weight sensor signals are calculated. Such, at least one "virtual weight sensor" is simulated using the signals of the real measurement weight sensors. This virtual weight sensor does not provide weight sensor signals based on a direct measurement but virtual weight sensor signals based on calculations.

The way how the virtual weight sensor signals are calculated depends on where the center of measurement weight sensor signals is positioned.

With the present invention, a lower number of measurement weight sensors can be used to determine, for example, the weight of a seat occupant. For example, the weight of a seat occupant can be calculated using two or three measurement weight sensors. "Missing" measurement weight sensors are simulated by one or more virtual weight sensors.

Such, a lower number of measurement weight sensors is required and therefore the sensor system 10 is more cost effective. Further, the sensor system 10 is easier to manufacture and to mount with regard to a vehicle and to a seat 12. Also, the sensor system 10 is easier to maintain because of a lower number of measurement weight sensors and functions more reliably.

In a further embodiment, a measurement weight sensor is associated with the virtual weight sensor. In particular, the virtual weight sensor is virtually positioned in a position on which the associated measurement weight sensor is seated. Such, the associated measurement weight sensor can be simulated by the corresponding virtual weight sensor and it can be checked (by comparing the corresponding measurement weight sensor signals and the virtual weight sensor signals calculated in accordance with the present invention) whether a malfunction of the associated measurement weight sensor is present or not. Such, a higher reliability of the sensor system 10 is reached.

The invention claimed is:

1. A sensor system for determining at least one of the weight and the position of a seat occupant, comprising:
   a control unit;
   at least two spaced measurement weight sensors;
   wherein each measurement weight sensor provides measurement weight sensor signals; and
   at least one virtual weight sensor providing virtual weight sensor signals, wherein a spatial data field is allocated to the seat and the sensor system, said spatial data field comprising sub-fields, and wherein calculation modes for virtual weight sensor signals depend on the sub-field in which a spatial center of measurement weight sensor signals falls;

wherein the at least one virtual weight sensor calculates the virtual weight sensor signals using the measurement weight sensor signals of at least one of the measurement weight sensors; and wherein the sensor system calculates at least one of the weight and the position of the seat occupant using the measurement weight sensor signals and the virtual weight sensor signals.

2. The sensor system according to claim 1, wherein the at least one virtual weight sensor is in the control unit.

3. The sensor system according to claim 1, wherein the calculations are done by the control unit.

4. The sensor system according to claim 1, wherein the at least one virtual weight sensor is used as a substitute for a measurement weight sensor.

5. The sensor system according to claim 4, wherein a seat mounting device takes the place of a substituted measurement weight sensor.

6. The sensor system according to claim 1, wherein the at least one virtual weight sensor is used in addition to an associated measurement weight sensor.

7. The sensor system according to claim 1, wherein the control unit is an external device in relation to the measurement weight sensors.

8. The sensor system according to claim 1, wherein the control unit is at least partially integrated in one or more measurement weight sensors.

9. The sensor system according to claim 8, wherein the control unit is distributed over several measurement weight sensors.

10. The sensor system according to claim 1, wherein the measurement weight sensors are positioned on the corners of a polygon, and the at least one virtual weight sensor is allocated to a corner of the polygon.

11. The sensor system according to claim 1, wherein a certain position in relation to the seat is allocated to the at least one virtual weight sensor.

12. The sensor system according to claim 11, wherein a calculation mode for the virtual weight sensor signals depends on which position is allocated to the at least one virtual weight sensor.

13. The sensor system according to claim 1, wherein a calculation mode for the virtual weight sensor signals depends on which measurement weight sensor or measurement weight sensors are used for calculating the virtual weight sensor signals.

14. The sensor system according to claim 1, wherein the control unit comprises a database with predetermined data stored, said predetermined data specifying calculation modes for calculating the virtual weight sensor signals.

15. The sensor system according to claim 14, wherein the predetermined data are in the form of predefined functions and/or of predefined tabular values and/or predefined algorithms.

16. The sensor system according to claim 14, wherein the predetermined data are seat-specific.

17. The sensor system according to claim 1, wherein the control unit comprises a virtual weight sensor unit which calculates virtual weight sensor data.

18. The sensor system according to claim 1, wherein the control unit comprises a data processing unit calculating a spatial center of the measurement weight sensor signals from measurement weight sensors.

19. The sensor system according to claim 1, wherein the control unit comprises a data processing unit which calculates at least one of seat occupant weight data and seat occupant position data using virtual weight sensor signals and measurement weight sensor signals.

20. The sensor system according to claim 19, wherein the data processing unit calculates the sum of the measurement weight sensor signals and of the virtual weight sensor signals.

21. The sensor system according to claim 1, wherein the control unit comprises a classification unit providing seat occupancy classification data classifying at least one of weight and position of the seat occupant.

22. The sensor system according to claim 21, wherein a seat occupancy classification data set is provided comprising a finite number of set elements.

23. The sensor system according to claim 21, wherein the seat occupancy classification data are provided to an airbag control unit.

24. The sensor system according to claim 1, wherein the calculation modes are determined such that the underlying data are, when crossing the border of adjacent sub-fields, continuous.

25. The sensor system according to claim 1, wherein a measurement weight sensor comprises a first part for fixing to a seat mounting element, and a second part for fixing to the seat.

26. A seat comprising the sensor system of claim 1.

27. The seat according to claim 26, wherein the sensor system is allocated to a seat bottom.

28. A method for determining at least one of the weight and the position of a seat occupant, comprising:
    providing measurement weight sensor signals from at least two spaced apart measurement weight sensors in a sensor system;
    calculating virtual weight sensor signals by using the measurement weight sensor signals of at least one measurement weight sensor;
    wherein the virtual weight sensor signals simulate a measurement weight sensor and wherein a spatial data field is allocated to the seat and the sensor system, said spatial data field comprising sub-fields, and wherein calculation modes for virtual weight sensor signals are chosen depending on the sub-field in which a spatial center of measurement weight sensor signals falls; and
    calculating at least one of the weight and the position of the seat occupant using measurement weight sensor signals and the virtual weight sensor signals.

29. The method according to claim 28, wherein the at least one virtual weight sensor is simulated by a control unit.

30. The method according to claim 28, wherein the at least one virtual weight sensor substitutes a measurement weight sensor.

31. The method according to claim 30, wherein a seat mounting device is mounted instead of a substituted measurement weight sensor.

32. The method according to claim 28, wherein the at least one virtual weight sensor is used to check the function of an associated measurement weight sensor.

33. The method according to claim 28, wherein a certain position in relation to the seat is allocated to the at least one virtual weight sensor.

34. The method according to claim 33, wherein a calculation mode for the virtual weight sensor signals is chosen depending on which position is allocated to the at least one virtual weight sensor.

35. The method according to claim 28, wherein a calculation mode for the virtual weight sensor signals is chosen depending on which measurement weight sensor or sensors are used for calculating the virtual weight sensor signals.

36. The method according to claim 28, wherein predetermined data specifying calculation modes for calculating the virtual weight sensor signals are provided.

37. The method according to claim 36, wherein the predetermined data are in the form of a predefined function and/or of predefined tabular values and/or of a predefined algorithm.

38. The method according to claim 36, wherein the predetermined data are seat-specific.

39. The method according to claim 28, wherein a spatial center of the measurement weight sensor signals from measurement weight sensors is calculated.

40. The method according to claim 28, wherein at least one of seat occupant weight data and seat occupant position data using virtual weight sensor signals and measurement weight sensor signals is calculated.

41. The method according to claim 40, wherein the sum of the measurement weight sensor signals and the virtual weight sensor signals is formed.

42. The method according to claim 28, wherein seat occupancy classification data classifying at least one of weight and position of the seat occupant are calculated.

43. The method according to claim 42, wherein a seat occupancy classification data set is provided comprising a finite number of set elements.

44. The method according to claim 42, wherein the seat occupancy classification data are provided to an airbag control unit.

45. The method according to claim 28, wherein the calculation modes are determined such that they are, when crossing a border of adjacent sub-fields, continuous.

* * * * *